United States Patent [19]

Ninomiya

[11] Patent Number: 5,467,470
[45] Date of Patent: Nov. 14, 1995

[54] COMPUTER ABLE TO DETERMINE WHETHER OR NOT A DISPLAY IS CONNECTED TO IT, IN ACCORDANCE WITH THE STATUS DATA STORED IN A REGISTER, AND METHOD OF DETECTING WHETHER OR NOT A DISPLAY IS CONNECTED TO A COMPUTER

[75] Inventor: Ryozi Ninomiya, Oome, Japan

[73] Assignee: Kabushiki Kaisha Toshiba, Kawasaki, Japan

[21] Appl. No.: 229,810

[22] Filed: Apr. 19, 1994

Related U.S. Application Data

[63] Continuation of Ser. No. 508,691, Apr. 13, 1990, abandoned.

[30] Foreign Application Priority Data

Apr. 28, 1989 [JP] Japan .................................. 1-110549

[51] Int. Cl.$^6$ .................................................. G06F 11/30
[52] U.S. Cl. ................... 395/183.03; 364/237.2; 364/264.1; 364/927.7; 364/942.7; 364/DIG. 1; 364/DIG. 2; 395/550; 395/183.13; 345/904
[58] Field of Search ..................................... 395/500, 575, 395/550

[56] References Cited

U.S. PATENT DOCUMENTS

| 4,447,889 | 5/1984 | Haneda | 364/900 |
|---|---|---|---|
| 4,500,933 | 2/1985 | Chan | 360/69 |
| 4,527,250 | 7/1985 | Galdun et al. | 364/900 |
| 4,575,714 | 3/1986 | Rummel | 340/568 |
| 4,611,203 | 9/1986 | Criscimagna | 340/773 |
| 4,647,912 | 3/1987 | Bates et al. | 340/825.5 |
| 4,761,762 | 8/1988 | Holmes | 364/900 |
| 4,831,532 | 5/1989 | Kondo | 364/426.02 |
| 5,008,846 | 4/1991 | Inoue | 364/707 |
| 5,041,817 | 8/1991 | Reeb | 340/635 |
| 5,159,683 | 10/1992 | Lvovsky et al. | 395/500 |

FOREIGN PATENT DOCUMENTS 2053533   2/1981   United Kingdom .

OTHER PUBLICATIONS

Pp. 4–9 beginning with the section entitled "Input Status Register O" of the reference referred to by the Applicant as the Personal System/2 Display Adapter.

Pp. 5–5 to 5–7 beginning with the section entitled "Monitor Connector" of the reference referred to by the Applicant as the Personal System/2 Display Adapter.

IBM Technical Disclosure Bulletin (vol. 30, No. 3, Jul. 1987, pp. 839–840, New York, U.S.; "Monitor Identification Technique").

IBM Personal System/2™ and Personal Computer BIOS Interface Technical Reference, pp. 2–39 with cover/information pages (Apr., 1987).

PVGA1A Paradise Video Graphics Array (manual), Western Digital Imaging/Paradise Systems, Version: Dec. 9, 1988, PDS 100 900, pp. 1–114.

Primary Examiner—Ken S. Kim
Attorney, Agent, or Firm—Finnegan, Henderson, Farabow, Garrett & Dunner

[57] ABSTRACT

A computer comprising a main body, a connector having pins for connecting an external display to the main body, a register for storing data representing a first status or a second status in accordance with the voltage of specified ones of the pins of said connector means, and a display controller for controlling the external display. The computer further comprises a data-reading section for repeatedly reading the data stored in the register and counting the number of times the data representing the first status is read from said register means, and detecting section for determining that the external display is connected to the connector when the number of times the data representing the first status is read from the register reaches a prescribed value.

7 Claims, 4 Drawing Sheets

F I G. 1

F I G. 2

FIG. 3A HSYNC

FIG. 3B RV,GV,BV SIGNAL

FIG. 4A VSYNC

FIG. 4B RV,GV,BV SIGNAL

FIG. 4C READ OPERATION TIMING

F I G. 5

500

COMPUTER ABLE TO DETERMINE WHETHER OR NOT A DISPLAY IS CONNECTED TO IT, IN ACCORDANCE WITH THE STATUS DATA STORED IN A REGISTER, AND METHOD OF DETECTING WHETHER OR NOT A DISPLAY IS CONNECTED TO A COMPUTER

This application is a continuation of application Ser. No. 07/508,691, filed Apr. 13, 1990, now abandoned.

BACKGROUND OF THE INVENTION

1. Field of the Invention

The present invention relates to a computer to which external display can be connected, and more particularly, to a computer which can determine whether or not an external display is connected to it, in accordance with the status data stored in a register, and also to a method of determining whether or not an external display is connected to a computer.

2. Description of the Related Art

In recent years, various portable personal computers, generally known as "lap-top personal computers", have been developed. The lap-top personal computers have a flat panel-type display such as a plasma display. The plasma display is hinged to the main body of the personal computer, and can be rotated between a closed position and an open position. When the plasma display is in the closed position, it is placed on the keyboard integral with the main body, rendering the entire computer portable. In view of this, the flat panel-type plasma display is desirable as a display for a lap-top personal computer which should be as compact as possible.

Some of the lap-top personal computers, which have been developed recently, are designed to be connected to an external cathode-ray tube (CRT) display, so that it can be used as a desk-top personal computer. Each of these lap-top personal computers has a connector for connecting the CRT display to the lap-top personal computer. Once the CRT display has been connected to this connector, data can be displayed on the CRT display, and can no longer be displayed on the plasma display. When the CRT display is not connected to the connector, data can be displayed on the plasma display.

Hence, which display, the plasma display or the CRT display, can display the data depends upon whether or not the CRT display is connected to the connector. The plasma display and the CRT display must be controlled in different methods to display the same data, by means of a display controller. To select an appropriate display-controlling method, it must be determine whether or not the CRT display is connected to the connector of the lap-top personal computer.

The connection or non-connection of the CRT display to the lap-top personal computer is determined by checking the fourth bit of the input status register incorporated in the display controller. The value of the fourth bit depends upon the total voltage of the specific pins of the connector. More precisely, when the CRT display is connected to the connector, the total voltage of these pins falls below a reference voltage, whereby status data "1" is set at the fourth bit of the input status register, thus indicating that the CRT display is connected to the lap-top personal computer. On the other hand, when the CRT display is disconnected to the connector, the total voltage of the specific pins becomes either equal to or higher than the reference voltage, whereby status data "0" is set at the fourth bit of the input status register, showing that the CRT display is not connected to the lap-top personal computer.

Therefore, when the fourth bit of the input status register has logic value of "1", it is determined that the CRT display is connected to the lap-top personal computer, and when this bit has logic value of "0", it is determined that the CRT display is not connected to the lap-top personal computer.

The fourth bit of the input status register represents the correct logic value while the personal computer remains in display mode, no matter whether or not the CRT display is connected to the personal computer. However, when the CRT display is not connected to the personal computer, the bit often represents a wrong logic value while the computer remains in non-display mode. Needless to say, while the computer is set in non-display mode, the display controller supplies no video signals to the plasma display or the CRT display. Without video signals supplied to the CRT display, the total voltage of the specific pins of the connector is lower than the reference voltage. In this case, the fourth bit of the input status register has logic value "1", representing that the CRT display is connected to the personal computer, which is not true. It should therefore be determined, while the computer is set in the display mode, whether or not the CRT display is connected to the lap-top personal computer, in accordance with the fourth bit of the input status register. Thus, in order to determine the connection or non-connection of the CRT display, it is necessary, first to detect that the personal computer is in a display mode, then to read the fourth bit of the input status register.

Here arises a problem. In the one horizontal scanning period (1 H) for scanning one horizontal line on the display screen of the CRT display, the display mode period for displaying the data on the display screen is as short as about 25 μs. It is next to impossible to detect, within such a short time, that the plasma display is in the display mode, and to read the fourth bit of the input status register. Even if it is detected that the CRT display is in the display mode within the one horizontal scanning period (1H), the fourth bit will be read, in most cases, after the display mode period has lapsed. Consequently, the fourth bit of the input status register, i.e., the status data, has logic value "1" even if the CRT is not connected to the lap-top personal computer. Thus it is inevitably determined that the CRT display is connected to the lap-top personal computer, which is not true. In brief, it has been difficult to determine, with accuracy, whether or not the CRT display is coupled to the personal computer.

SUMMARY OF THE INVENTION

One object of the present invention is to provide a computer which can accurately determine whether or not an external display is connected to it.

Another object of the invention is to provide a method of determining with high accuracy whether or not an external display is connected to a computer.

According to this invention, there is provided a computer comprising a main body, a connector section having pins for connecting an external display to the main body, a register section for storing data representing a first status or a second status in accordance with the voltage of the specified ones of the pins of the connector section, a display controller for controlling a display, a data-reading section for repeatedly reading the data from the register section and counting the number of times the data representing the first status is read from the register section, and a detecting section for determining that a display is connected to the computer, when the number of times the data representing the first status is read from the register section reaches a predetermined value.

The data-reading section reads the data stored in the register section repeatedly at regular intervals. Usually, a display displays data for a period several times longer than it displays no data at all. Hence, when the data-reading section reads the data repeatedly at regular intervals, it reads the data more times during a data-display period than during the non-display period. For the reason described above, the data which the register section stores during a non-display period fails, in most cases, to indicate correctly whether or not a display is connected to the computer. Nevertheless, since the data-reading section reads the data many more times during a data-display period than during the non-display period, it reads far more correct data items than incorrect data items. Therefore, the detecting section can determine with high accuracy whether or not a display is connected to the computer.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

DETAILED DESCRIPTION OF THE PREFERRED EMBODIMENT

Figure 1:
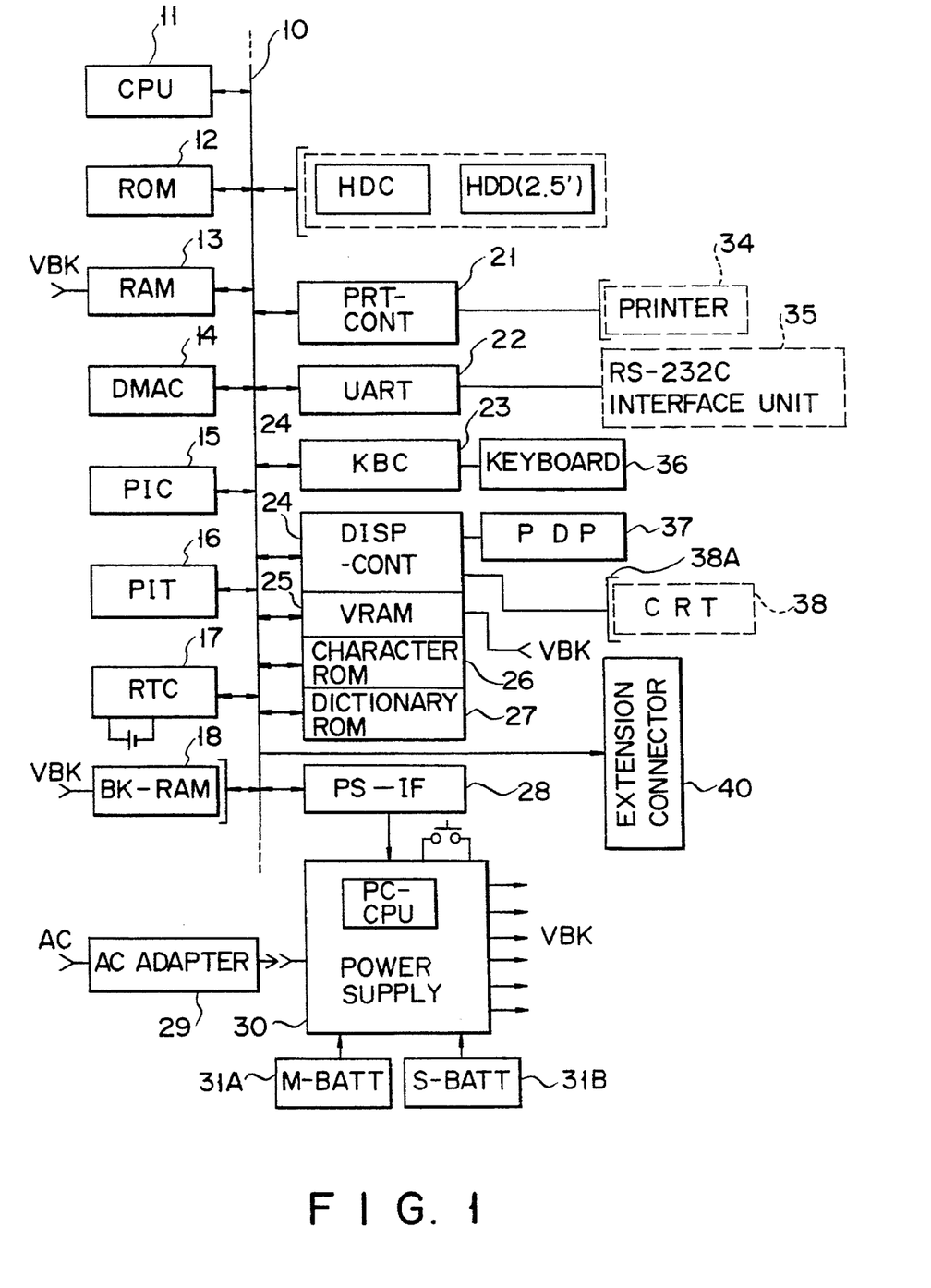
FIG. 1 is a block diagram schematically illustrating a computer according to an embodiment of the present invention.

As is illustrated in FIG. 1, a lap-top type personal computer according to an embodiment of this invention comprises a system bus (S-BUS) 10. It also comprises a CPU 11, a ROM 12, a RAM 13, a DMAC (Direct Memory-Access Controller) 14, a PIC (Programmable Interrupt Controller) 15, a PIT (Programmable Interval Timer) 16, and an RTC (Real-Time Clock) 17, all connected to the system bus 10.

The CPU 11 can determine whether or not a CRT display 38 is connected to the computer. The ROM 12 stores fixed programs which the CPU 11 executes to perform various operations. The RAM 13 is provided for storing data and programs for processing the data. It has a storage capacity of 1.5 MB, of which 640 KB is used as a main memory and the remaining 896 KB is used as a so-called hard RAM. A backup-power voltage (VBK) is applied to the RAM 13 at all times, even while the power-supply switch of the computer is off. The DMAC 14 controls the direct memory access. The PIC 15 controls interrupts in accordance with a program set to it. The PIT 16 is set in accordance with a program. The RTC 17 is a clock module which contains a battery for itself only.

Also connected to the system bus 10 are: a backup RAM (BK-RAM) 18, a printer controller (PRT-CONT) 21, a universal asynchronous receiver/transmitter (UART) 22, a keyboard controller (KBC) 23, a display controller (DISP-CONT) 24, a video RAM (V-RAM) 25, a character ROM 26, and a dictionary ROM 27.

The backup RAM 18 has a region for storing data to achieve data-resuming, and is always applied with the backup voltage (VBK). The printer controller 21 is used to control a printer 34 connected to the computer. The receiver/transmitter 22 functions as an input/output interface. The keyboard controller 23 is connected to a keyboard 36 to control the keyboard 36.

The display controller 24 is connected to the plasma display panel (PDP) 37, for controlling the display 37 or a CRT display 38 connected to the computer. The display controller 24 comprises a VGA (Video Graphics Array) system which can display a multicolor image in high resolution. The controller 24 has an input status register for storing status data representing, as will be described later, whether or not the CRT display 38 is connected to the computer. In accordance with the status data, the CPU 11 determines whether or not the CRT display 38 is connected to the computer.

The video RAM (VRAM) 25 is applied with the backup voltage VBK at all times. The character ROM 26 stores data items representing the dot patterns of various kinds of characters, including (i.e., Chinese characters). Any data item is read from the character ROM 26 when the code of the character represented by this data item is input by operating the keyboard 36. The dictionary ROM 27 is a Kana-to-Kanji conversion table. When the operator inputs a Japanese word spelled with Kanas characters (i.e., Japanese syllabic characters), along with a Kana-to-Kanji conversion command, by operating the keyboard 36, the data representing the Japanese word written in Kanji characters, which corresponds to the word spelled with Kanas characters, is read from the dictionary ROM 27.

Further, a power-supply control interface (PS-IF) 28 is connected to the system bus 10, connecting a power-supply circuit 30 to the CPU 11. An AC adapter 29 is plugged into the receptacle incorporated in the main body 1 (not shown) of the computer, and is thus connected to the power-supply circuit 30. The adapter 29 rectifies and smoothens the alternating current supplied from the commercially available AC power supply, into a direct current of a predetermined voltage. The power-supply circuit 30 contains a power control CPU (PC-CPU) for monitoring the internal power supply of the computer at all times, no matter whether the power-supply switch of the computer is on or off.

A main battery (M-BATT) 31A and a sub-battery (S-BATT) 31B are connected to the power supply circuit 30. The main battery 31A is a chargeable, packed detachable battery attached to the main body of the computer. The sub-battery 31B is a chargeable battery set in the main body 1.

The printer 34 is connected only when necessary. An interface 35, i.e., RS-232C, is coupled to the input/output interface 22 when necessary. The keyboard 36 is connected to the keyboard controller 23. The plasma display panel 37 is hinged to the main body of the computer and can rotate between a closed position and an open position. The panel 37 is electrically connected to the display controller 24. The CRT display 38 is connected, when necessary, to the display controller 24 by means of a connector 38A. An extension connector 40 is coupled to the system bus 10, for connecting an extension unit (not shown) to the system bus 10 when necessary.

Figure 2:
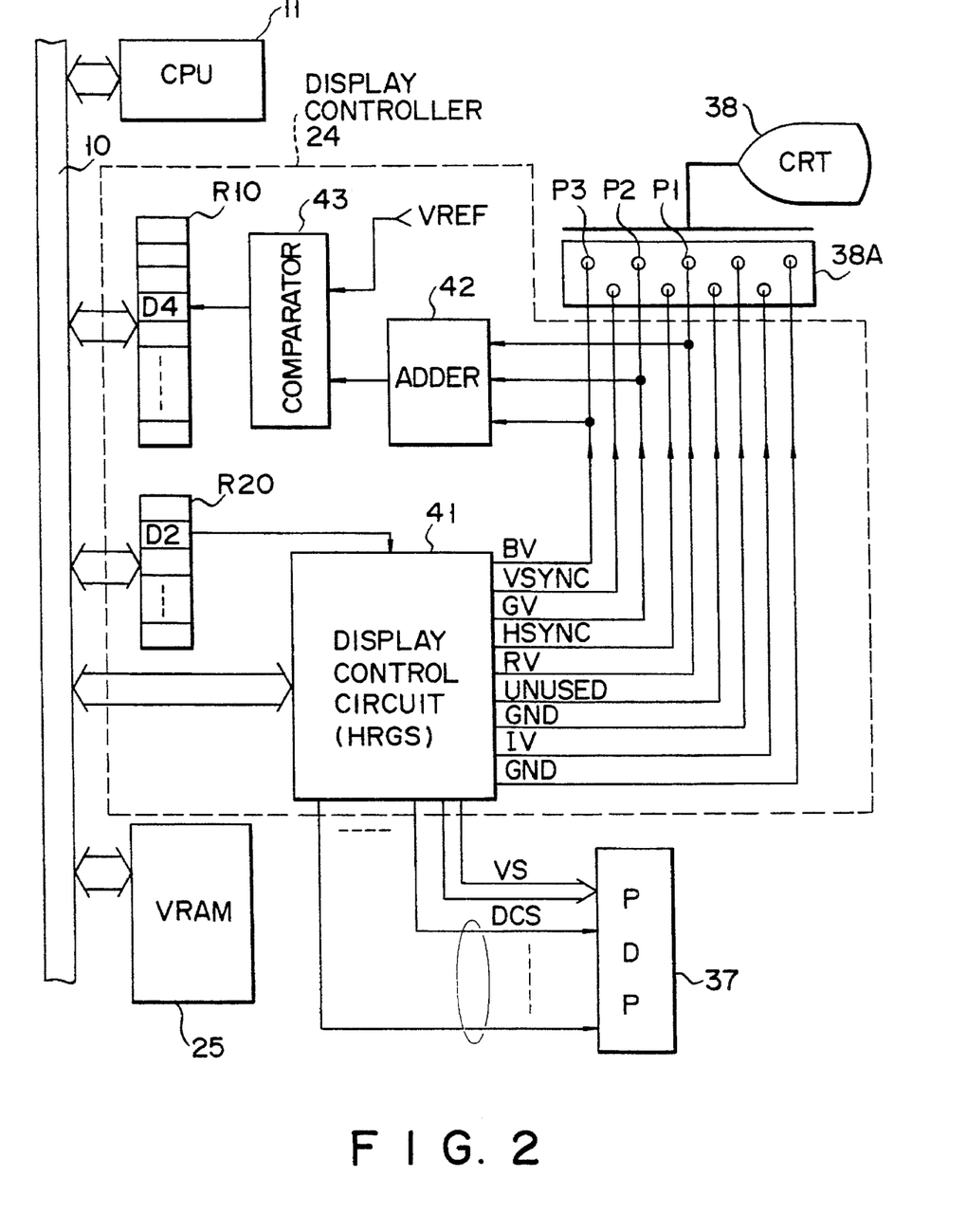
FIG. 2 is a block diagram of the display controller incorporated in the computer shown in FIG. 1.

FIG. 2 is a block diagram showing the display controller 24 in detail. As is evident from this figure, the controller 24 comprises a display control circuit 41, an adder 42, a comparator 43, an input status register R10, and an output status register R20.

The display control circuit 41 comprises a high-resolution graphics sub-system (HRGS) and is designed to supply video signals and various display control signals to the plasma display 37 or the CRT display 38. The video signals have been generated from the display data stored in the video RAM 25. To which display, the plasma display 37 or the CRT display 38, the video signals and the display control signals should be supplied depends upon the output-status data D2 placed in the second bit of the output status register R20. More specifically, when the data D2 is "1", the display control circuit 41 supplies the CRT display 38 with video signals suitable for the CRT display 38 (i.e., red video signals RV, green video signals GV, blue video signals BV) and various signals for controlling the CRT display 38 (i.e., a horizontal sync signal HSYNC, a vertical sync signal VSYNC, a luminance signal IV, and a ground-potential voltage GND) to the CRT display 38 through the connector 38A. On the other hand, when the data D2 is "0", the display control circuit 41 supplies the plasma display 27 with the video signals VS suitable for the plasma display 37 and the various signals DCS for controlling the plasma display 37.

The adder 42 add the three voltages of the three output pins P1, P2, and P3 which receive the red video signal RV, the green video signal GV, and the blue video signal BV from the display control circuit 41. The adder 42 outputs the voltage, which is the sum of the voltages applied on the pins P1, P2, and P3, to the comparator 43. The comparator 43 compares the input voltage with a reference voltage VREF. When the input voltage is lower than the voltage VREF, the comparator 43 sets the status data D4 placed on the fourth bit of the input status register R10 at logic value "1". The status data D4 set at logic value "1" is supplied to the CPU 11 via the system bus 10, as status data showing that the CRT display 38 is connected to the computer. When the input voltage is equal to or higher than the reference voltage VREF, it sets the status data D4 at logic value "0". The status data D4 set at logic value "0" is supplied to the CPU 11 via the system bus 10, as status data showing that the CRT display 38 is not connected to the computer.

Assume that the CRT display 38 is not connected to the connector 38A. The output voltage of the adder 42 is equal to or higher than the reference voltage VREF while the computer remains in the display mode. This is because, as long as the computer remains in the display mode, the display control circuit 41 keeps supplying the red video signal RV, the green video signal GV, and the blue video signal BV to the connector 38A. The status data D4 is set at logic value "0", representing that the CRT display 38 is not connected to the connector 38A. However, while the computer remains in the non-display mode, the output voltage of the adder 42 is lower than the reference voltage VREF since the display control circuit 41 supplies no video signals to the connector 38A. In this case, the status data D4 is inevitably set at logic value "1", representing that the CRT display 38 is connected to the connector 38A, which is not true. In short, when the CRT display 38 is not connected to the connector 38A, the status data D4 is set at correct logic value "0" while the computer is set in the display mode, but is set at erroneous logic value "1" while the computer is set in the non-display mode.

In contrast, when the CRT display is connected to the connector 38A, the output pins P1, P2, and P3 are discharged by the internal resistor of the CRT display 38, and the total voltage of these pins is lower than the reference voltage VREF, whether the computer is in the display mode or the non-display mode. As a result, the status data D4 is set at correct logic value "1" while the computer is set in either mode, the display mode or the non-display mode.

Although the status data D4 placed on the fourth bit of the input status register R10 is correct when the CRT display 38 is coupled to the connector 38A, whether the computer is set in the display mode or the non-display mode, it assumes an incorrect logic value "1" when the CRT display is not connected to the connector 38A, while the computer is set in the non-display mode.

According to the invention, the CPU 11 determines, with high accuracy, that the CRT display 38 is not connected to the connector 38A, even if the status data D4 assumes the incorrect logic value of "1" despite that the CRT display is connected to the connector 38A, while the computer is set in the non-display mode. It will now be described how the CPU 11 operate so, with reference to FIGS. 3A and 3B and FIGS. 4A to 4C.

Figure 3A:
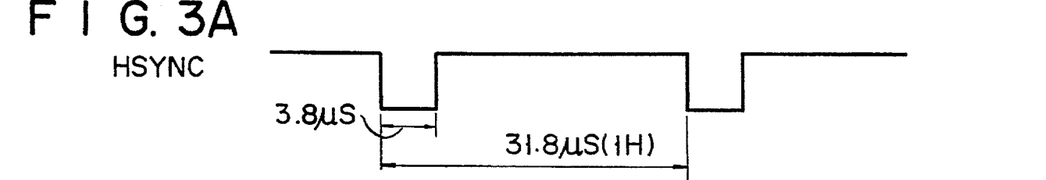
FIGS. 3A and 3B are each timing chart showing the horizontal sync signal and a video signal, and explaining how the display controller controls the CRT display connected to the computer.
Figure 3B:
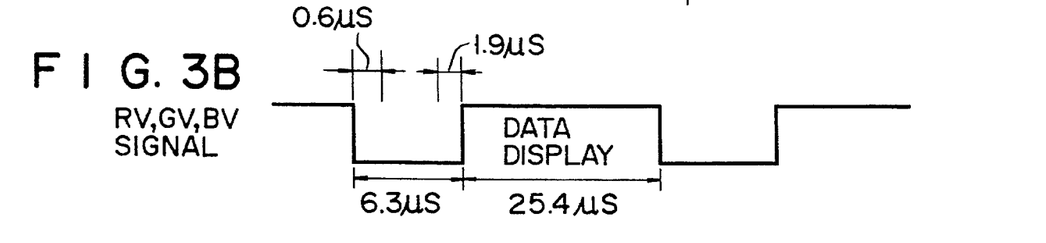

FIGS. 3A and 3B are timing charts, representing the relationship between the horizontal sync signal HSYNC and the video signals RV, GV, and BV. The horizontal sync signal HSYNC is supplied from the display control circuit 41 to the CRT display 38 via the connector 38A. As FIG. 3A shows, the horizontal sync signal HSYNC is at low level for each horizontal blanking period of 3.8 µs, which is part of one horizontal scanning period (1H) of 31.8 µs. As is evident from FIGS. 3A and 3B, the display control circuit 41 outputs no video signals during the horizontal blanking period (3.8 µs), a period of about 0.6 µs before the horizontal blanking period, and a period of about 1.9 µs after the horizontal blanking period. The sum of the 3.8 µs-blanking period, the 0.6 µs-period, and the 1.9 µs-period, i.e., a period of 6.3 µs-period, is defined as non-display period of the CRT display 38. Obviously, this non-display period is about four times shorter than the data-display period of 25.4 µs during which the display control circuit 41 outputs the video signals RV, GV, and BV.

Figure 4A:
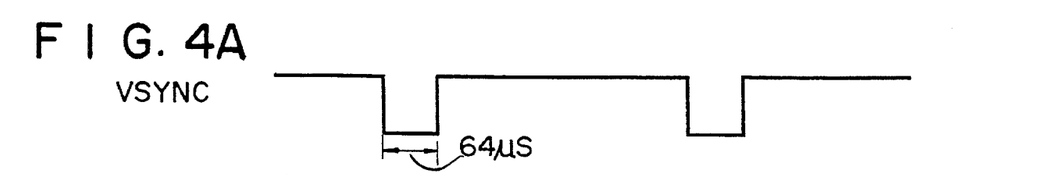
FIGS. 4A, 4B, and 4C are each timing chart representing the relationship among the vertical sync signal for controlling the CRT display, the video signals supplied to the CRT display, and the timing of reading data from the input status register incorporated in the display controller.
Figure 4B:
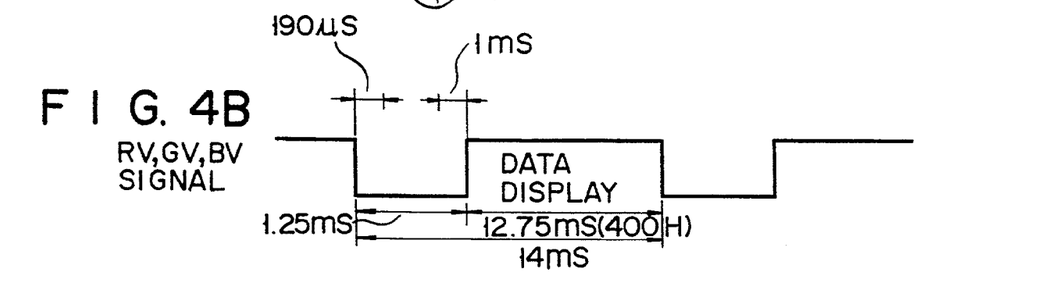
Figure 4C:
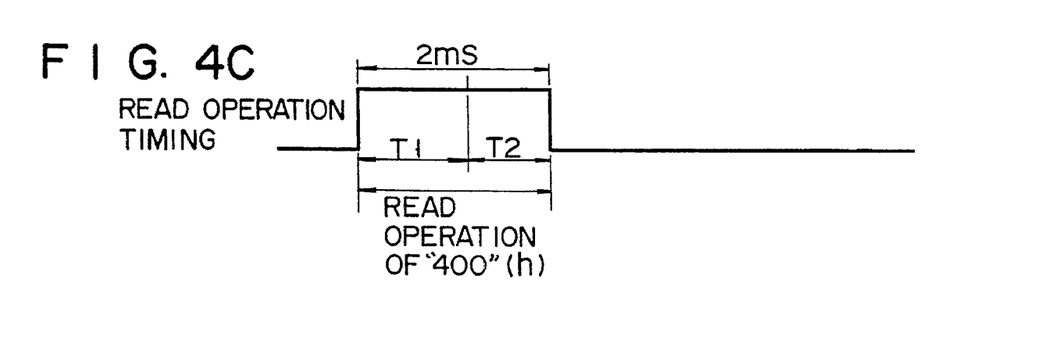

FIGS. 4A, 4B, and 4C are timing charts representing the relationship among a vertical sync signal VSYNC and video signals RV, GV, and BV, all supplied from the display control circuit 41 to the CRT display 38 via the connector 38A, and the timing at which the CPU 11 reads the status data D4 from the input status register R10. As FIG. 4A shows, the vertical sync signal VSYNC is at low level for each vertical blanking period of 64 µs. As is evident from FIGS. 4A and 4B, the control circuit 41 outputs no video signals during the vertical blanking period of 64 µs, a period of 190 µs before the vertical blanking period, and a period of 1 ms after the vertical blanking period. The sum of the 64 μs-blanking period, the 190 μs-period, and the 1 ms-period, i.e., a period of about 1.25 ms, is defined as non-display period of the CRT display 38. Obviously seen from FIG. 4B, this non-display period is part of one field-scanning period of 14 ms during which 400 horizontal lines are scanned.

To determine whether or not the CRT display 38 is connected to the connector 38A, the CPU 11 repeatedly reads the contents of the input status register R10 during a period which is longer than the non-display period of 1.25 ms, for instance a period of 2 ms, as is shown in FIG. 4C. For that part T1 (1.25 ms) of the 2 ms-period which overlaps the non-display period of 1.25 ms, the CPU 11 can read but the logic value which the status data D4 assumes during the non-display period. Nonetheless, for the remaining part T2 (0.75 ms) of the 2 ms-period, which does not overlap the non-display period, the CPU 11 can read the status data D4 assumes during the data-display period.

In most cases, the time the CPU 11 requires to read the data stored in the input status register R10 is slightly shorter than 2 μm. Therefore, the CPU 11 can reads the contents of the register R10, 1024 times during the data-read period of 2 ms, that is, 644 times during the period T1 of 1.25 ms and 380 times during the period T2 of 0.75 ms. As has been pointed out before, the non-display period during the one horizontal scanning period (1 H) is four times shorter than the data-display period. Hence, the number of times the CPU 11 actually reads the data of the register R10 during the data-display period is 304 (380×4/5). This numerical value is obtained by subtracting the number of times the CPU 11 reads the contents of the register R10 during the non-display period in each horizontal scanning period (1H), from the number of times (i.e., 380) the CPU 11 reads the data during the period T2. It follows that the CPU 11 reads the data 720 times during the non-display period (=1024−304).

As is shown in FIGS. 4B and 4C, the data-reading period of 2 ms overlaps the entire non-display period of 1.25 ms. This is the case where the CPU 11 can read the contents of the input status register R10 the least number of times, i.e., 304 times, during the data-display period. Thus, the CPU 11 can repeatedly read the contents of the register R10 during the non-display period, at most 720 times (=1024−304).

The CPU 11 counts those of the 1024 status data items read during the data-read period of 2 ms, which have logic value "1", determines that the CRT display 38 is not connected to the connector 38A when the count is less than a predetermined value, and determines that the CRT display 38 is connected to the connector 38A when the count is equal to or more than the predetermined value. The predetermined value is greater than 720 but not exceeding 1024, for the following reason.

The status data D4 stored in the input status register R10 has logic value "1" either when the CRT display 38 is connected to the connector 38A or when the CRT display 38 is not connected to the connector 38A while the computer is in the non-display mode. The logic value "1" the data D4 assumes when the CRT display 38 is coupled to the connector 38A is correct, whereas the logic value "1" the data D4 has when the CRT display 38 is not connected to the connector 38A is erroneous. The CPU 11 reads the erroneous status data D4, at most 720 times which is the greatest number of times the CPU 11 reads the data D4 during the non-display period. This is why the predetermined value is greater than 720. Therefore, the CPU 11 actually reads the status data D4 having logic value "1" less times than the predetermined value, in any case when the CRT display 38 is not connected to the connector 38A.

The predetermined value must not exceed 1024, i.e., the number of times the CPU 11 can read the status data D4 from the register R10 during the data-reading period of 2 ms. This is because, if the total voltage of the pins P1, P2 and P3 of the connector 38A varies due to the noise components of the signals supplied from the display control circuit 41, the status data D4 may have logic value "0" even when the CRT display 38 is connected to the connector 38.

Since the predetermined value is greater than 720 but not greater than 1024, the CPU 11 can determine, with accuracy, whether or not the CRT display 38 is connected to the connector 38A.

Figure 5:
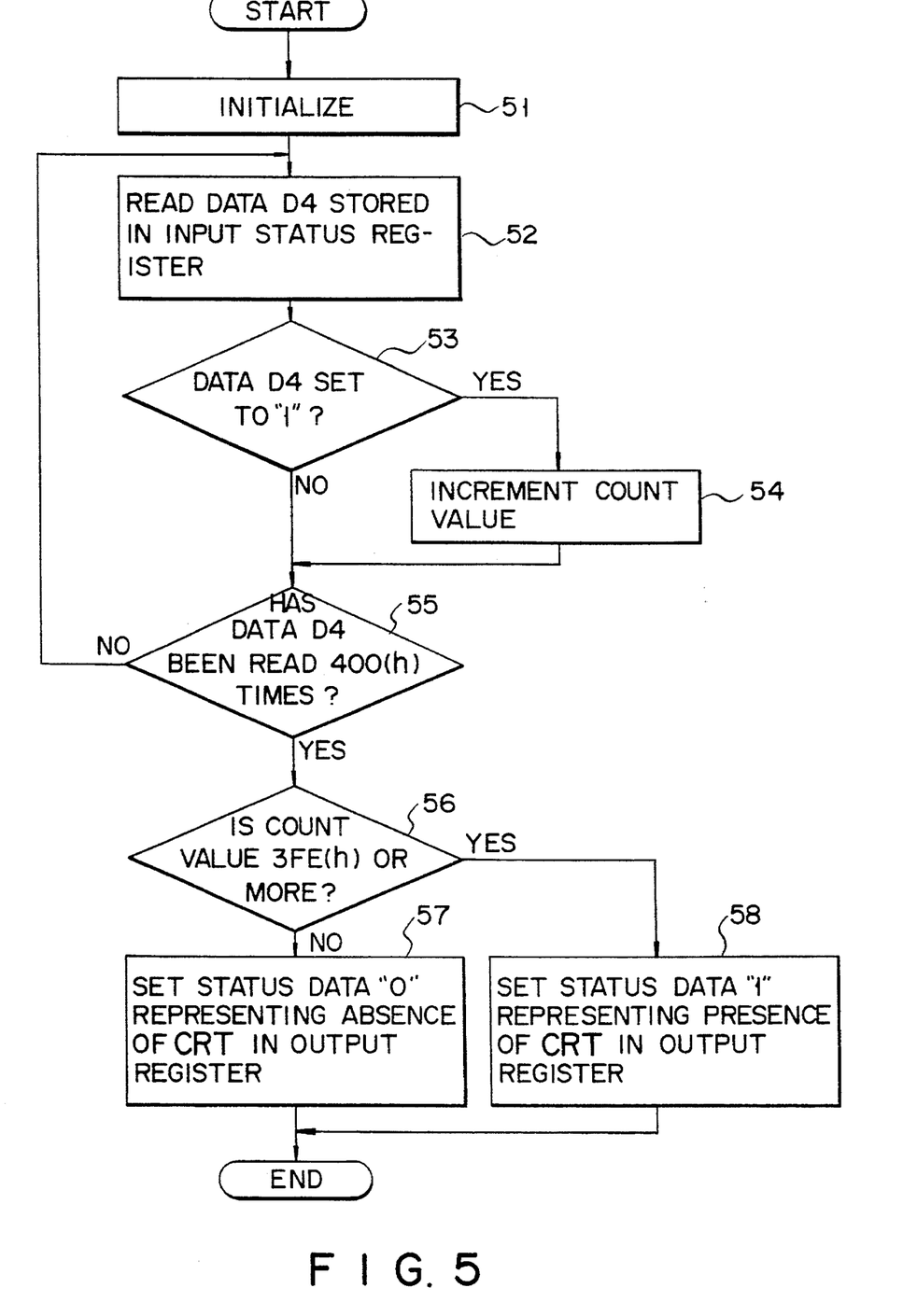
FIG. 5 is a flow chart explaining how the computer shown in FIG. 1 determines whether or not a display is connected to it.

It will now be explained how the CPU 11 determines whether or not the CRT display 38 is connected to the connector 38A, with reference to the flow chart of FIG. 5.

First, in step 51, the CPU 11 initializes the display controller 24 (FIG. 2). To be more precise, the CPU 11 sets the output status data D2 of "1" to the second bit of the output status register R20. Then, the display control circuit 41 supplies the video signals RV, GV, and BV and the display control signals HSYNC and VSYNC to the connector 38A. When the total voltage of the output pins P1, P2, and P3 of the connector 38A is lower than the reference voltage VREF, the status data D4 stored at the fourth bit of the input status register R10 assumes logic value "1", representing that the CRT display 38 is connected to the connector 38A. Conversely, when the total voltage of the output pins P1, P2, and P3 is equal or higher than the reference voltage VREF, the status data D4 takes logic value "0", thus indicating that the CRT display 38 is not coupled to the connector 38A. Further, the software counter, or internal counter of CPU 11, is cleared.

Then, in step 52, the CPU 11 reads the status data D4 from the input status register R10. In the next step, step 53, the CPU 11 determines whether or not the data D4 has logic value "1". If YES, the flow advances to step 54, in which the count of the software counter increases by one. Then, the flow goes to step 55. If NO in step 53, the flow also goes to step 55. In step 55, the CPU 11 determines whether or not the data D4 has been read "400 (h)" times (i.e., the hexadecimal notation for 1024 times). If NO, the CPU 11 repeats steps 52, 53, and 54 until the data D4 is read 1024 times, whereby the software counter counts the status data items having logic value "1" which the CPU 11 has read from the input status register R10.

If YES in step 55, that is, if the CPU 11 has read the status data D4 1024 times, the CPU 11 determines in step 56 whether or not the count of the software counter is equal to or greater than "3FE" (i.e., the hexadecimal notation for 1022). If NO, the CPU 11 determines that the CRT display 38 is not connected to the connector 38A. Hence, the CPU 11 sets the output status data D2, i.e., the second bit of the output register R20, at logic value "0". In response to the output status data D2 having logic value "0", the display controller 41 supplies the plasma display 37 with video signals and display control signals, all suitable for the plasma display 37. If YES in step 56, that is, if the count of the software counter is equal to or greater than "3FE", the CPU 11 determines that the CRT display 38 is connected to the connector 38A. Then, in step 58, the CPU 11 sets the output status data D2 at logic value "1". In response to the output status data D2 having logic value "1", the display controller 41 supplies the CRT display 38 with the video signals RV, GV, and BV and the display control signals HSYNC and VSYNC—all being suitable for the CRT display 38.

As has been described, the CPU 11 determines that the CRT display 38 is not connected to the connector 38A when the count is less than a predetermined value, which is greater than 720 but not exceeding 1024. However, in this instance, the predetermined value is 1022, or "3FE" in hexadecimal notation. This is because, the more the prescribed value approximates 1024 (or "400" in hexadecimal notation), i.e., the number of times the CPU 11 reads the status data D4 during the data-reading period of 2 ms, the less possible is it that the CPU 11 determines that the CRT display 38 is connected to the connector 38A, when the opposite is true. The predetermined value is not 1024 in this instance, because the status data D4 may otherwise have logic value "0" even when the CRT display 38 is coupled to the connector 38A, if the total voltage of the pins P1, P2 and P3 of the connector 38A varies due to the noise components of the signals supplied from the display control circuit 41.

In the embodiment described above, the CRT display 38 is used as an external display. Instead, any other type of a display, such as a high-resolution plasma display larger than the plasma display 37, or a liquid-crystal display, can be used as an external display of the computer according to the invention.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A computer capable of being connected to an external display, the computer comprising:

a main body;

connector means having pins for connecting the external display to said main body;

register means for storing data representing a first status or a second status depending on the value of a voltage of specified ones of the pins of said connector means, wherein the first status indicates a first condition in which the external display is connected to the computer during a video signal period and a second condition in which the external display is connected or not connected to the computer during a blanking period of the external display, and wherein the second status indicates that the external display is not connected to the computer during the video signal period;

display control means for controlling said external display, the display control means generating and supplying video signals to the external display through the specified pins of the connector means during the video signal period of the external display;

data-reading means for repeatedly reading the data stored in said register means during a first period longer than the blanking period, and for counting the number of times the data representing the first status is read from said register means; and detecting means for determining that said external display is connected to the computer, when the number of times the data representing the first status is read from said register means is greater than the greatest number of times said data-reading means can read the data stored in the register means during the blanking period of said external display.

2. The computer according to claim 1, wherein said external display is a CRT display.

3. The computer according to claim 1, further comprising a flat panel type display.

4. The computer according to claim 1, wherein said computer comprises an internal display provided in said main body, and said display control means controls only the internal display when said detecting means does not determine that the external display is connected to the computer.

5. A method of determining whether a CRT display is connected to a computer comprising a register means, connector means having a plurality of pins, and CRT display control means for generating and supplying video signals to the CRT display during a video signal period of the CRT display, said method comprising the steps, performed in the computer, of:

repeatedly reading data stored in the register means during a first period longer than a blanking period of said CRT display, wherein the data represents a first status or a second status depending on the value of a voltage of specified ones of the pins of said connector means, wherein the first status indicates a first condition in which the CRT display is connected to the computer during the video signal period and a second condition in which the CRT display is connected or not connected to the computer during the blanking period of said CRT display, and wherein the second status indicates that the CRT display is not connected to the computer during the video signal period;

counting the number of times the data representing the first status is read from said register means; and determining that said CRT display is connected to the computer, during the video signal period and the blanking period, when the number of times the data representing the first status read from said register means is greater than the greatest number of times the data can be read during the blanking period of said CRT display.

6. A computer system having a main body, a flat panel display provided in the main body, and a CRT display removably connected to a connector of the main body, the connector having pins for supplying video data to the CRT display, said system comprising:

register means for storing data representing a first status or a second status depending on the value of a voltage of a specified one of the pins of said connector means, wherein the first status indicates a first condition in which the CRT display is connected to the computer during a video signal period and a second condition in which the CRT display is connected or not connected to the computer during a blanking period of said CRT display, and wherein the second status indicates that the CRT display is not connected to the computer during the video signal period;

display control means for controlling said flat panel display and said CRT display, said display control means generating and supplying video signals to the CRT display through the specified pins of the connector means during the video signal period of the CRT display to determine whether the CRT display is connected to the computer system;

data-reading means for repeatedly reading the data stored in said register means during a first period longer than the blanking period, and for counting the number of times the data representing the first status is read from said register means; and detecting means for determining that said CRT display is connected to the computer system, when the number of times the data representing the first status is read from said register means is greater than the greatest number of times said data-reading means reads during the blanking period of said CRT display.

7. The computer system according to claim 6, wherein said display control means controls only the flat panel display when said detecting means does not determine that said CRT display is connected to the computer system.

* * * * *